May 10, 1927.
F. W. RIEHL
1,628,193
HEADLIGHT FOR MOTOR VEHICLES
Filed Dec. 6, 1922     2 Sheets-Sheet 1
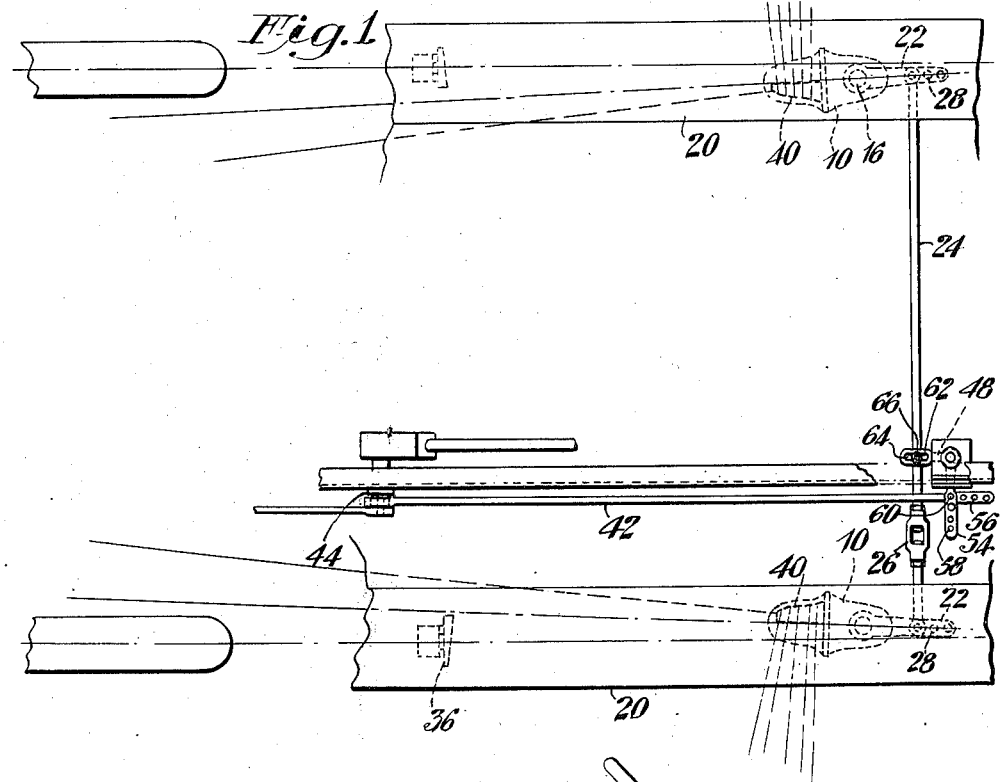
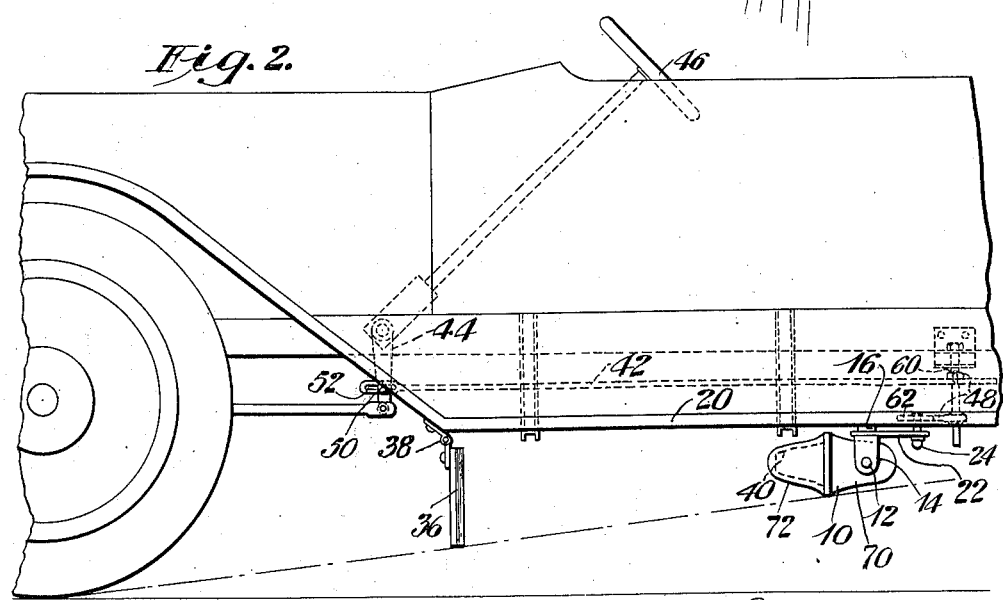
Frederick W. Riehl Inventor
By His Attorney
Edmund G. Borden

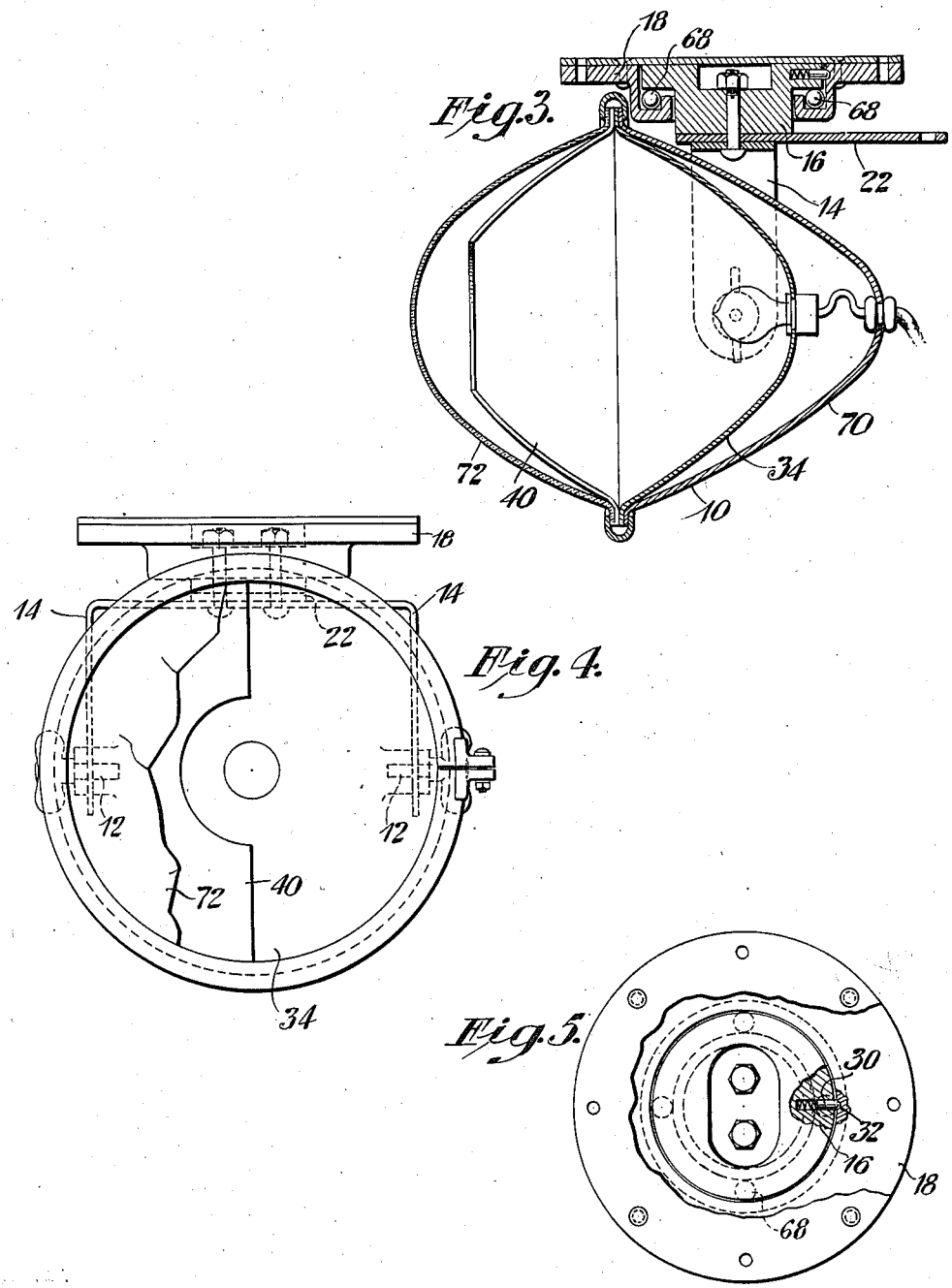

Patented May 10, 1927.

1,628,193

UNITED STATES PATENT OFFICE.

FREDERICK WILLIAM RIEHL, OF YONKERS, NEW YORK.

HEADLIGHT FOR MOTOR VEHICLES.

Application filed December 6, 1922. Serial No. 605,147.

This invention relates to headlights for motor vehicles and more particularly to headlights of the type which is used on automobiles and trucks.

The glare of the automobile headlight has become a menace to vehicle drivers and to the public. This glare from high power reflectors is the cause of a large number of accidents and has been the subject of many regulatory laws and ordinances. To overcome the headlight glare heretofore it has been customary to use many different kinds of lamp lenses, and to provide dimmers to cut down the intensity of the light when one automobile approaches another. A study of the different kinds of lenses in use seems to indicate that if the lens eliminates the glare it cuts down the intensity of the light to such an extent as to seriously interfere with its lighting properties. On the other hand, the operation of the dimmers depends upon the automobile operators, and they are not reliable.

The primary object of the present invention is to provide a headlight for mobile vehicles which will give the desired lighting in front of a vehicle without the undesirable glare.

Another object of the invention is to provide a headlight which will direct light in the line of the path of travel of a vehicle and will also direct light to the side of the vehicle.

A further object of the invention is to provide a headlight for vehicles which is adjustable with the turning movement of the vehicle to maintain light in the direct path of the vehicle.

A further object of the invention is to provide a headlight which may use a plain or magnifying glass lens to obtain strong illumination while still holding the illuminating rays below the line of vision of an approaching pedestrian or vehicle operator.

With these and other objects and features in view the invention consists in the improved automobile headlight hereinafter described and specifically defined in the appended claims.

The various features of the invention are illustrated in the accompanying drawings, in which:

Fig. 1 is a diagrammatic plan view illustrating the mounting of the headlights embodying the preferred form of the invention on the under side running boards of an automobile chassis;

Fig. 2 is a view in side elevation showing the mounting of the improved headlight on an automobile chassis;

Fig. 3 is a vertical sectional view; Fig. 4 is a view in front elevation, and Fig. 5 is a top plan view of the improved headlight.

In the present invention the headlight lamps are mounted below the running boards on the opposite sides of the vehicle a sufficient distance back of the front of the vehicle so that the bottom of the vehicle acts as a screen to cut off the portion of the stream of rays emanating from the lamps which extends up to the line of vision of an approaching pedestrian or vehicle operator. The stream of light is held so close to the surface of the road that when a vehicle operator is far enough ahead of the lamps for the light rays to reach the line of vision, the distance is so great that the operator will not be annoyed by the glare. The front wheels are used as a screen to cut off rays from one side of the stream of rays emanating from the lamp which might make a glare for the approaching operator, and a reflector for throwing a stream of rays to the side of the automobile is used to cut off rays from the other side of the stream of rays. By this means the illumination is controlled to cut off glare from the direct path of travel of the vehicle and from both sides of the path.

Referring to the drawings, the headlights 10 are pivotally mounted by means of trunnions 12 in yoke frames 14. The frames 14, see Figs. 3 and 4, are attached to the lower side of the blocks 16 that are rotatably mounted about a vertical axis in holders 18. The holders 18 are secured to the lower side of the running boards 20 mounted at opposite sides of the vehicle chassis.

The lamps are mounted substantially in the longitudinal line intersecting front and rear wheels and are normally adjusted so that the principal focal rays of the stream of light emanating from the lamp will pass within the inner sides of the front wheels. To obtain the adjustment of the lamps, arms 22 attached to the blocks 16 extend rearwardly therefrom and these arms are connected together by means of a rod 24. The rod 24 is provided with a turnbuckle 26 by which the lamps may be adjusted about the vertical axis of the frames 14. The arms 22 are provided with a series of slots 28 to permit the adjustment of the frames 14 to be such that when the lamps are in normal position for throwing the focal rays inside of the front wheels a spring pressed detent 30 will engage slots 32 in the holders 18. The lamps 10 are provided with the usual parabolic reflectors 34 which direct a stream of light longitudinally of the vehicle and directly ahead thereof. The inner concentrated focal rays of the vehicle are arranged to pass inside of the inner face of the front wheel, but the wheels themselves will act as a screen to cut off rays from the side of the stream so that the light will not enter the line of vision of an approaching vehicle operator who is located at the side of the direct line of travel of the vehicle having the improved lamp. The front wheels do not always remain in a fixed position, since they are angularly adjusted to steer the vehicle, and therefore they are not always in position to screen off the side rays emanating from the lamps. To cut off the side rays a screen 36 is attached to the lower side of the running board a substantial distance in front of the lamp to act to cut off the side rays, if the front wheel is not in position to cut off these rays. The screen 36 extends downwardly toward the surface of the road a considerable distance to protect the lamp from mud, water, or dirt, which might be thrown by the wheels; and the screen is preferably connected to the running board by means of a hinge 38 which will allow the screen to yield if it strikes an obstruction. The weight of the screen however will normally hold it in vertical position so that the screen will effectively intercept the light rays. The front face of the screen 36 is preferably formed at an angle as shown in Fig. 1 to reflect the rays coming from the lamp and throw them transversely of the line of travel of the car to assist in lighting the road at the side of the car.

The screen 36 and front wheel act to effectively cut off rays from one side of the stream of light emanating from the lamp and rays of light at the other side of the stream are cut off by a reflector 40 mounted in the lamp in front of the reflector 34. As shown, particularly in Fig. 4, the reflector 40 does not cut off the concentrated focal rays from the reflector 34 and covers only one-half of the inner portion of the reflector 34. The reflector 40 however does act to cut off the side rays of the stream so that the stream of light projecting from the lamp in front of the car will not extend very far to the side of the path of travel of the vehicle. The reflector 40 while cutting off the side rays from the reflector 34 acts to again reflect these rays to the side of the vehicle to illuminate the road at the side of the vehicle, so that approaching vehicle drivers can have a clear vision of the relative position of the vehicles. As shown in Figs. 1 and 2, the lamps 10 are arranged so that the reflectors 40 throw out rays at each side of the vehicle and also cut off rays from the side of the stream of rays which passes between the front wheels.

If the headlights are held in a fixed position at the front end of a vehicle they do not act to effectively illuminate the path of travel of the vehicle at the time it is turning a corner, because the angular turning movement of the car is different from the angular turning movement of the front wheels. In the present invention the headlights are arranged to be angularly adjusted to correspond to the adjustment of the front wheels in order to provide an effective illumination of the path in front of the vehicle at the time it is turning a corner. To accomplish this the steering mechanism of the front wheels is connected with the lamps so that when the mechanism is operated for turning the vehicle, the lamps will be simultaneously and correspondingly angularly adjusted to shift the illumination into the line of travel of the front wheels. The connections between the steering mechanism and the lamps consist of a rod 42 connected between a lever 44 operated by the steering wheel 46 and a bell crank lever 48 connected between the rod 42 and the rod 24. The connection of the rod 42 with the lever 44 consists of a pin 50 in the lever 44 and a slot 52 in the rod 44. This pin and slot connection permits the steering wheel to be operated through a predetermined distance which is usually required in holding the car to the direct course on the road without moving the lamps. It is only after the steering mechanism has been moved a sufficient distance to bring the end of the slot in connection with the pin that the lamp will be adjusted to correspond to the angular setting of the front wheels. The connection of the rod 42 with an arm 54 of the bell crank 48 consists of a series of slots 56 on the rod 42 and slots 58 in the arm 54 with a pin 60 to connect the rod and arm together. By this form of connection the effective length of the fulcrum arm 54 may be varied to vary the relative angular adjustment of the lamps with a given adjustment of the steering mechanism. This variable adjustment will provide any desired angular movement of the lamp to throw light into a position to clearly illuminate the path of the vehicle. Normally, the angular movement of the lamp will be substantially one-half the angular movement of the front wheels to properly illuminate the path of the vehicle. The arm 62 of the bell crank 48 is provided with a slot 64 which engages a pin 66 in the rod 24 to provide for the angular movement of the arm 62 in moving the rod. With this construction sufficient provision is made for varying the angular adjustment of the lamps and the same connections may be used for different makes and sizes of vehicles.

By removing the pin which connects the rod 24 to the arm 22 the headlight lamps 10 may be rotated through a full circle to direct the concentrated rays to the side or rear of an automobile to illuminate the back of the car for repairing parts at the back of the wheel or changing tires, and, further, a strong light will be provided to warn vehicles approaching from the rear that the vehicle is standing in the roadway. To provide a frictionless adjustment of the lamps ball bearings 68 are mounted in a raceway in the holders 18 below an outwardly projecting flange of the block 16.

With the headlight construction outlined above, it will be apparent that the full strength of the lights from headlights having a plain glass lens may be used for illuminating the roadway without interference of glare of vehicles approaching one another. Furthermore, the headlights give a local illumination of the road at the side of the vehicle, and also act to effectively illuminate the running boards of the vehicles to avoid injury to persons entering or leaving the vehicle. The headlight is concealed below the running board in a position where it will not be damaged and is effectively protected from rain and water on the roadway. The reflectors are preferably enclosed within the lamp housing 70 and a plain glass cover lens 72 which encloses the front reflector 40.

The preferred form of the invention having been thus described, what is claimed as new is:

1. The combination of a mobile vehicle, a headlight lamp mounted in a frame at the side of the vehicle, said frame being adjustable about a substantially horizontal axis, and said frame being attached to the vehicle so as to be adjustable about a substantially vertical axis, a parabolic reflector in said lamp arranged to direct a stream of light rays substantially in the direct line of travel of the vehicle, and a reflector in the lamp for throwing a stream of rays substantially transverse of the line of travel of the vehicle.

2. The combination of a mobile vehicle, lamps mounted on the bottom of the running board at each side of the vehicle, a steering mechanism for the front wheels, a reflector in the lamp for directing a stream of light longitudinally of the vehicle, a screen extending downwardly from the running boards a substantial distance in front of the lamps in position to cut off rays from the side of the stream of light emanating from the reflectors, and a connection between the steering mechanism and the lamps arranged to angularly adjust the lamps proportionately to the angular adjustment of the front wheels.

3. The combination of a mobile vehicle, a headlight lamp having a reflector attached to the vehicle and extending below the chassis, said lamp being located a sufficient distance back from the front of the vehicle to cut off light rays emanating from the reflector that would extend as high as or above the line of vision of an approaching pedestrian or vehicle operator at any point in front of the lamp to such a distance that they would be annoyed by the headlight glare, and manually operable connections extending between the lamp and the vehicle operator's position by which the angular position of the lamp may be varied.

4. The combination of a mobile vehicle, headlight lamps mounted at opposite sides of the vehicle in the rear of the front wheels, said lamps being positioned in a frame movable about a vertical axis and normally held in a fixed position by a detent, a steering mechanism connected to the front wheels of the vehicle, connections between said mechanism and the lamp constructed to angularly adjust the lamp proportionately to the angular adjustment of the front wheels, and a lost motion device in said connections arranged to permit predetermined movement of the steering mechanism without moving the lamps.

5. The combination of a mobile vehicle, headlight lamps secured to the bottoms of the running boards on opposite sides of the vehicle, reflectors mounted in frames attached to the lower sides of the running boards, said frames being positioned directly behind the front wheels and rotatably mounted about a substantially vertical axis, spring pressed detents for normally holding said lamps in a position so that the inner focal rays will be directed inside of the inner side of the front wheels, a steering mechanism connected to the front wheels of the vehicle, connections between the steering mechanism and the lamps constructed to angularly adjust the lamps proportionately to the angular adjustment of the front wheels, and a lost motion device in the side connection arranged to permit predetermined movement of the steering mechanism without affecting the normal position of the lamps.

6. The combination of a mobile vehicle, headlight lamps mounted in frames attached to the vehicle below the chassis, said frames being mounted for movement about a vertical axis, and said lamps being movably mounted in a horizontal axis in said frames, an adjustable connection between the said lamps and means for normally holding the lamps in a fixed position to direct the focal rays inside of the inner side of the front wheels.

7. The combination of a mobile vehicle, headlight lamps mounted at opposite sides of the vehicle in the rear of the front wheels, a steering mechanism connected to the front wheels, connections between the steering mechanism and the lamps constructed to angularly adjust the lamps to illuminate the path of movement of the vehicle, regardless of the angular adjustment of the front wheels.

In testimony whereof I affix my signature.

FREDERICK WILLIAM RIEHL.